(12) United States Patent
Andre et al.

(10) Patent No.: US 10,936,366 B2
(45) Date of Patent: Mar. 2, 2021

(54) METHODS, APPARATUS, AND COMPUTER PROGRAM PRODUCTS FOR ACCESSING A SHARED COMPUTING RESOURCE

(71) Applicant: International Business Machines Corporation, Armonk, NY (US)

(72) Inventors: Herve G. P. Andre, Orlando, FL (US); Todd C. Sorenson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 142 days.

(21) Appl. No.: 16/208,330

(22) Filed: Dec. 3, 2018

(65) Prior Publication Data
US 2020/0174837 A1 Jun. 4, 2020

(51) Int. Cl.
*G06F 9/48* (2006.01)
*G06F 9/50* (2006.01)
*G06F 11/22* (2006.01)

(52) U.S. Cl.
CPC .......... *G06F 9/4887* (2013.01); *G06F 9/5038* (2013.01); *G06F 11/22* (2013.01); *G06F 2209/501* (2013.01); *G06F 2209/503* (2013.01); *G06F 2209/508* (2013.01)

(58) Field of Classification Search
CPC ................. G06F 9/4887; G06F 9/5038; G06F 2209/501; G06F 2209/503; G06F 2209/508; G06F 11/22
See application file for complete search history.

(56) References Cited

U.S. PATENT DOCUMENTS

| | | | | |
|---|---|---|---|---|
| 7,434,012 B1* | 10/2008 | Ives | ...................... | G06F 11/106 711/112 |
| 7,529,982 B1* | 5/2009 | Coatney | .............. | G06F 11/1076 714/54 |
| 8,230,439 B2 | 7/2012 | Amsterdam et al. | | |
| 8,370,720 B2* | 2/2013 | Allen | ..................... | G06F 11/106 714/773 |
| 2006/0190938 A1* | 8/2006 | Capek | ....................... | G06F 9/46 717/161 |
| 2013/0030785 A1 | 1/2013 | Satterfield et al. | | |
| 2014/0325523 A1 | 10/2014 | Picinich et al. | | |
| 2015/0066813 A1* | 3/2015 | Andreatta | ............... | G06F 9/505 706/11 |
| 2019/0095288 A1* | 3/2019 | Formato | ............. | G06F 11/1461 |

* cited by examiner

*Primary Examiner* — Jacob D Dascomb
(74) *Attorney, Agent, or Firm* — Kunzler Bean & Adamson

(57) ABSTRACT

Methods that can access a shared computing resource are provided. One method includes determining, by a processor, a level of stress for a shared computing resource during each increment of time in a predetermined period of time, determining an optimized block of time within the predetermined period of time to perform a set of background operations on the shared computing resource based on the determined level of stress, and performing the set of background operations during the optimized block of time. Apparatus and computer program products that can include, perform, and/or implement the methods are also provided.

20 Claims, 10 Drawing Sheets

METHODS, APPARATUS, AND COMPUTER PROGRAM PRODUCTS FOR ACCESSING A SHARED COMPUTING RESOURCE

FIELD

The subject matter disclosed herein relates to computing systems and devices and, more particularly, relates to methods, apparatus, and computer program products that can access a shared computing resource.

BACKGROUND

When computing resources are shared among several computing entities, there is always the potential of access contention between the computing entities. That is, computing entities often compete with one another when accessing shared devices, which can affect the performance of the computing entities and/or the computing resources. Contention issues can further arise when a storage device is tasked with performing background operations while one or more computing entities are also attempting to access the storage resource.

BRIEF SUMMARY

Methods, apparatus, and computer program products that can access a shared computing resource are provided. One method includes determining, by a processor, a level of stress for a shared computing resource during each increment of time in a predetermined period of time, determining an optimized block of time within the predetermined period of time to perform a set of background operations on the shared computing resource based on the determined level of stress, and performing the set of background operations during the optimized block of time.

An apparatus includes an optimization module that determines an optimized block of time within a predetermined period of time to perform a set of background operations on a shared computing resource and a task module that performs the set of background operations during the optimized block of time, in which the optimized block of time is determined based on a level of stress for the shared computing resource during each increment of time in the predetermined period of time. In various embodiments, at least a portion of the modules include one or more of a set of hardware circuits, a set of programmable hardware devices, and executable code stored on a set of non-transitory computer-readable storage media.

One computer program product includes program instructions embodied therewith and executable by a processor. The program instructions cause the processor to determine a level of stress for a shared computing resource during each increment of time in a predetermined period of time, determine an optimized block of time within the predetermined period of time to perform a set of background operations on the shared computing resource based on the determined level of stress, and perform the set of background operations during the optimized block of time.

BRIEF DESCRIPTION OF THE DRAWINGS

So that at least some advantages of the technology may be readily understood, more particular descriptions of the embodiments briefly described above are rendered by reference to specific embodiments that are illustrated in the appended drawings. Understanding that the drawings included herein only depict some embodiments, the embodiments discussed herein are therefore not to be considered as limiting the scope of the technology. That is, the embodiments of the technology that are described and explained herein are done with specificity and detail utilizing the accompanying drawings, in which.

DETAILED DESCRIPTION

Figure 1:
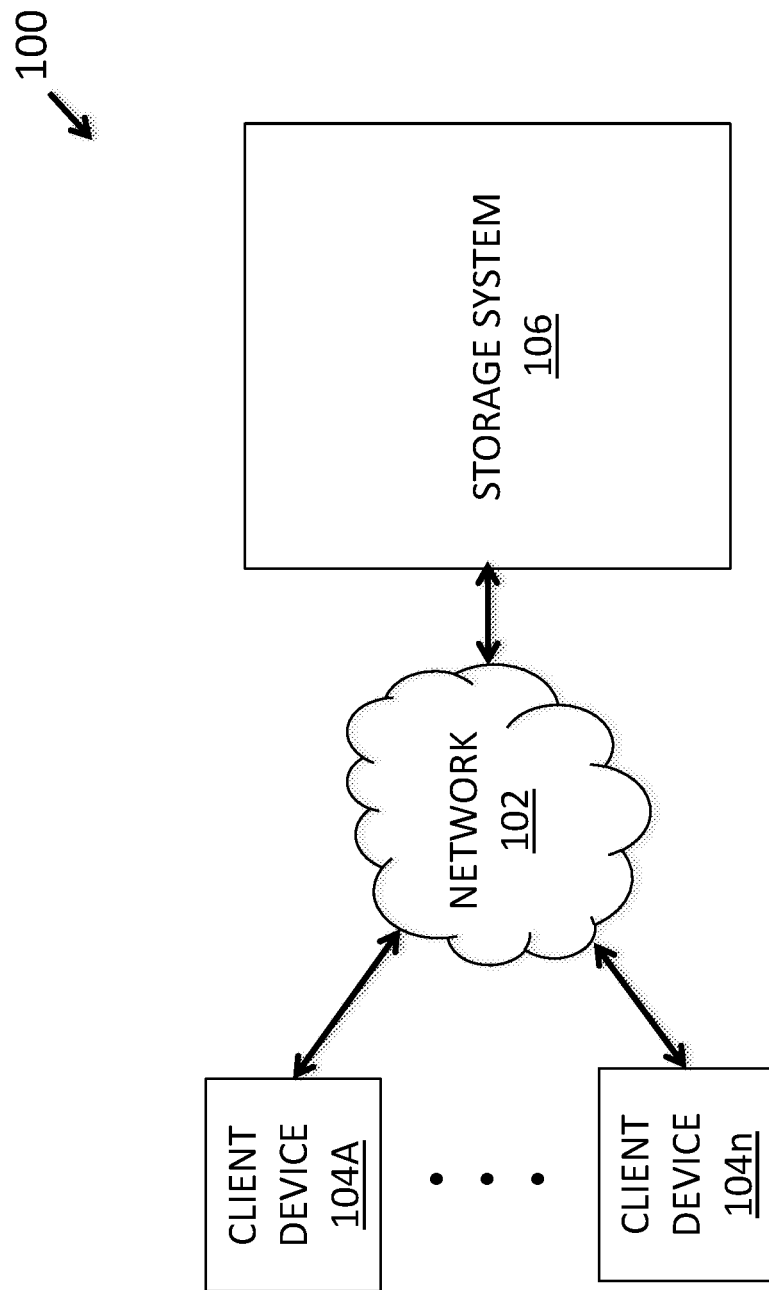
FIG. 1 is a block diagram of one embodiment of a storage network that can access a storage resource.

Disclosed herein are various embodiments providing methods, systems, and computer program products that can merge protocols for storage networks and systems. Notably, the language used in the present disclosure has been principally selected for readability and instructional purposes, and not to limit the scope of the subject matter disclosed herein in any manner.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "including," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more," unless expressly specified otherwise.

In addition, as used herein, the term "set" can mean "one or more," unless expressly specified otherwise. The term "sets" can mean multiples of or a plurality of "one or mores," "ones or more," and/or "ones or mores" consistent with set theory, unless expressly specified otherwise.

Further, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present technology may be a system, a method, and/or a computer program product. The computer program product may include a computer-readable storage medium (or media) including computer-readable program instructions thereon for causing a processor to carry out aspects of the present technology.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove including instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fibre-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibres, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present technology may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). To perform aspects of the present technology, in some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry.

Aspects of the present technology are described herein with reference to flowchart illustrations and/or block diagrams of methods, apparatus (systems), and computer program products according to embodiments of the technology. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium including instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technology. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

To more particularly emphasize their implementation independence, many of the functional units described in this specification have been labeled as modules. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure below may refer to elements of proceeding figures. For instance, like numbers can refer to similar elements in all figures, including alternate embodiments of similar elements.

With reference now to the drawings, FIG. 1 is a block diagram of one embodiment of a storage network 100 (or system) including a network 102 connecting a set of client devices 104A through 104n (also simply referred individually, in various groups, or collectively as client device(s) 104) and a storage system 106. The network 102 may be any suitable wired and/or wireless network 102 (e.g., public and/or private computer networks in any number and/or configuration (e.g., the Internet, an intranet, a cloud network, etc.)) that is known or developed in the future that enables the set of storage devices 104 and the storage system 106 to be coupled to and/or in communication with one another and/or to share resources. In various embodiments, the network 102 can comprise a cloud network (IAN), a SAN (e.g., a storage area network, a small area network, a server area network, and/or a system area network), a wide area network (WAN), a local area network (LAN), a wireless local area network (WLAN), a metropolitan area network (MAN), an enterprise private network (EPN), a virtual private network (VPN), and/or a personal area network (PAN), among other examples of computing networks and/or or sets of computing devices connected together for the purpose of sharing resources that are possible and contemplated herein.

A client device 104 can be any suitable computing hardware and/or software (e.g., a thick client, a thin client, or hybrid thereof) capable of accessing the storage system 100 via the network 102. Each client device 104, as part of its respective operation, relies on sending I/O requests to the storage system 106 to write data, read data, and/or modify data. Specifically, each client device 104 can transmit 110 requests to read, write, store, communicate, propagate, and/or transport instructions, data, computer programs, software, code, routines, etc., to the storage system 106 and may comprise at least a portion of a client-server model. In general, the storage system 106 can be accessed by the client device(s) 104 and/or communication with the storage system 106 can be initiated by the client device(s) 104 through a network socket (not shown) utilizing one or more inter-process networking techniques.

Figure 2:
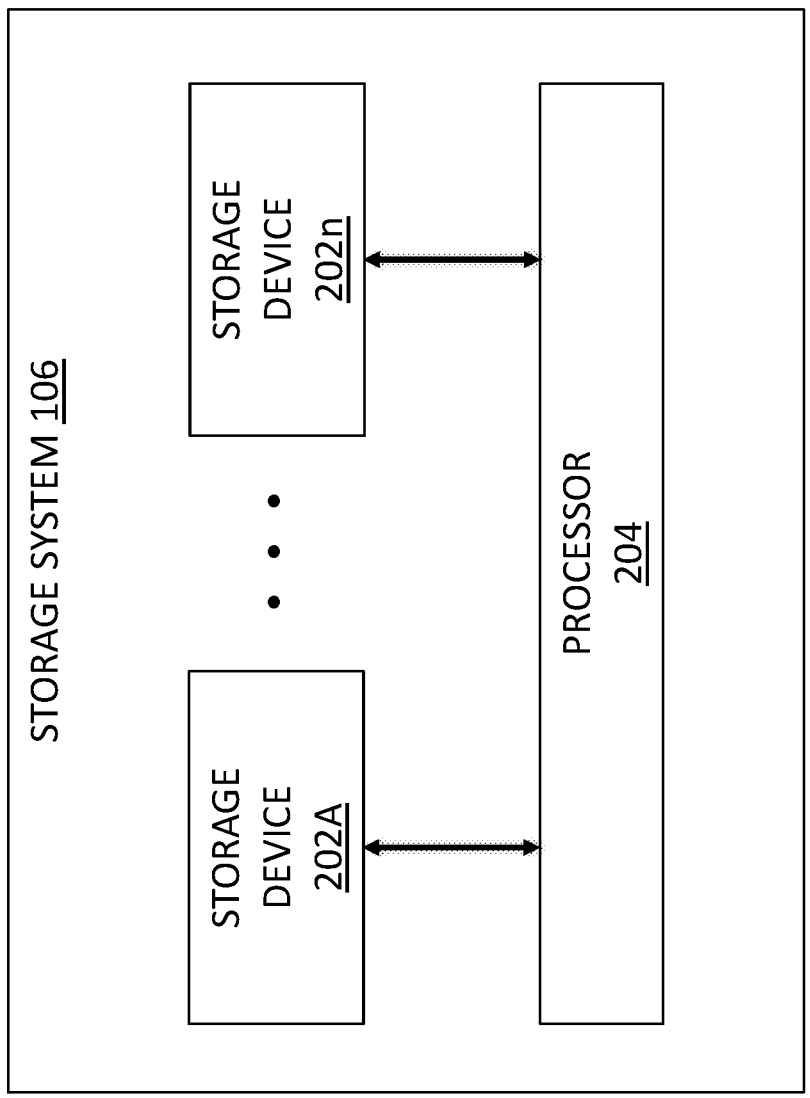
FIG. 2 is a block diagram of one embodiment of a storage system included in the storage network of FIG. 1.

Referring to FIG. 2, FIG. 2 is a block diagram of one embodiment of a storage system 106 illustrated in and discussed with reference to FIG. 1. At least in the illustrated embodiment, the storage system 106 includes, among other components, a set of storage devices 202A through 202n (also simply referred individually, in various groups, or collectively as storage device(s) 202) and a processor 204 coupled to and/or in communication with one another.

A storage device 202 may include any suitable type of device and/or system that is known or developed in the future that can store computer-useable data. In various embodiments, a storage device 202 may include one or more non-transitory computer-usable mediums (e.g., readable, writable, etc.), which may include any non-transitory and/or persistent apparatus or device that can contain, store, communicate, propagate, and/or transport instructions, data, computer programs, software, code, routines, etc., for processing by or in connection with a computer processing device. In some embodiments, a storage device 202 includes an array of hard drives.

A storage device 202 may include any suitable size that can provide storage space for one or more storage applications for a set of client devices 104. Further, a storage device 202 can store data a set of data blocks, data segments, and/or data chunks including any suitable size that is known or developed in the future.

A processor 204 may include any suitable non-volatile/persistent hardware and/or software configured to perform and/or facilitate data storage operations on the storage devices 202, including, but not limited to, data migration, data archiving, data backup, data rebuilding, data mirroring, replicating data, etc. For instance, a processor 204 may include non-volatile and/or persistent hardware and/or software to perform short-term and/or long-term data storage operations on the storage devices 202, which may include write operations, read operations, read-write operations, data migration operations, etc., among other operations that are possible and contemplated herein.

In various embodiments, a processor 204 may include hardware and/or software that can receive I/O requests (e.g., write request, read request, and/or read-write request, etc.) from the client device(s) 104 (see FIG. 1) and perform corresponding I/O operations (e.g., write operations, read operations, and/or read-write operations, etc.) on the storage devices 202 in response thereto. A processor 204 may further include hardware and/or software for executing instructions in one or more modules and/or applications that can provide intelligent access a storage resource (e.g., storage device(s) 202).

Figure 3A:
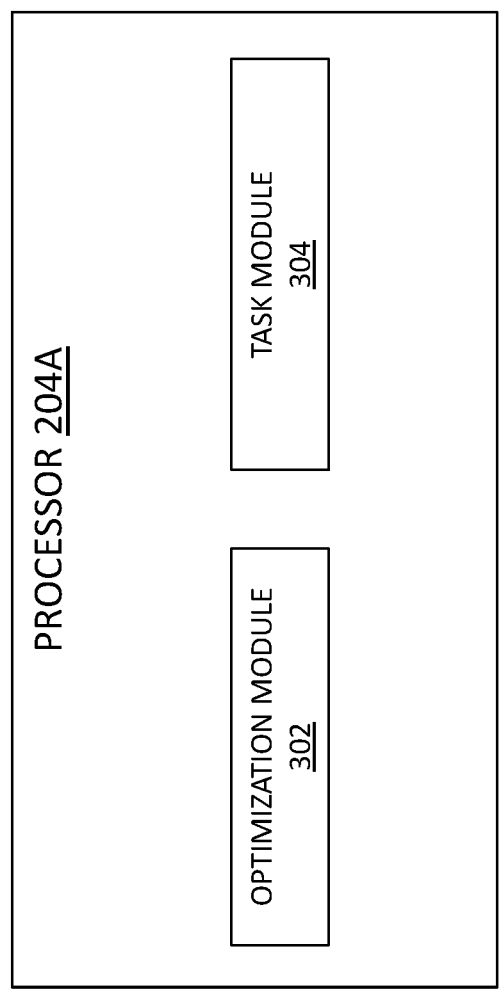
FIGS. 3A and 3B are block diagrams of various embodiments of a processor included in the storage system of FIG. 2.

With reference to FIG. 3A, FIG. 3A is block diagram of one embodiment of a processor 204A that can be included in the storage system 106 illustrated in and discussed with reference to FIG. 2. At least in the illustrated embodiment, the processor 204A includes, among other components, an optimization module 302 and a task module 304.

An optimization module may include any suitable hardware and/or software that can determine an optimized and/or optimal block of time within a predetermined period of time to perform a set of background operations on each storage device 202 of a set of storage devices (e.g., one or more of storage devices 202A through 202n). The optimized/optimal block of time may be determined based on a level of stress for a storage device 202 during each increment of time in the predetermined period of time.

The predetermined period of time may be any suitable amount of time. In various embodiments, the predetermined amount of time is four (4) days, among other periods of time that are possible and contemplated herein. That is, the predetermined period of time can be less than four days (e.g., 1 hour, 12, hours, one day, two days, etc.) or greater than four days (e.g., one week, two weeks, a month, etc.). In some embodiments, the predetermined period of time is an amount of time between performing one or more background operations on the storage system 106. In further embodiments, the predetermined period of time is an amount of time between performing media scrub operations on the storage system 106 (e.g., four days, among other periods of time that are possible and contemplated herein).

An increment of time within the predetermined period of time may be any suitable subset of time. In various embodiments, an increment of time can be a second, a minute, an hour, or a day, among other suitable increments of time that are possible and contemplated herein. In some embodiments, the increment of time is a minute, among other increments of time that are greater than or less than one minute. In embodiments, in which the predetermined period of time is one day and the increment of time is one minute, the optimized/optimal block of time may be determined based on a level of stress for a storage device 202 for 1440 increments of time (e.g., 60 minutes/hour×24 hours=1440 minutes). Other embodiments may include a different quantity of time increments based on the length of the predetermined amount of time and/or the length of each time increment within a particular period of time.

An optimized/optimal block of time within the predetermined period of time may include any suitable amount of time. In various embodiments, the optimized block of time includes the amount of time it takes to perform one or more background operations on the storage system 106 and/or one or more of the storage devices 202, as discussed elsewhere herein. In some embodiments, the optimized block of time includes the amount of time it takes to perform media scrub operations on the storage system 106 and/or one or more of the storage devices 202, as discussed elsewhere herein.

In some embodiments, the optimization module 302 is configured to receive (e.g. from a stress module 306 (see FIG. 3B)) a level of stress for each storage device 202 at each increment of time during the predetermined amount of time, as discussed elsewhere herein. In additional or alternative embodiments, the optimization module 302 is configured to receive (e.g. from a tracking module 308 (see FIG. 3B)) the level of stress for each storage device 202 at each increment of time during the predetermined amount of time over an extended amount of time (e.g., tracked over multiple predetermined periods of time), as discussed elsewhere herein.

The extended amount of time may include any suitable amount of time greater than the amount of time in the predetermined period of time. In various embodiments, the extended amount of time may include an amount of time that is greater than or equal to two predetermined periods of time (e.g., two or more predetermined periods of time). In various embodiments in which the predetermined period of time is one day, the extended amount of time may include one week (e.g., seven days), two weeks (e.g., fourteen days), three weeks (e.g., twenty-one days), or one month (e.g., twenty-eight days, thirty days, or thirty-one days), among other quantities of days that are possible and contemplated herein.

In some embodiments, the extended amount of time is thirty days, the predetermined period of time is one day, and the predetermined period of time is divided into 1440 increments of time of one minute each. Here, the optimized block of time for performing the background operations (e.g., media scrub operations) on the storage system 106 and/or on one or more storage devices 202 is determined based on the stress level of a particular storage device 202 over the extended amount of time.

In determining the optimized block of time, the optimization module 302 is configured to divide the predetermined period of time into blocks of time that are equal to the amount of time it takes to perform one or more background operations on the storage system 106 and/or one or more of the storage devices 202. In some embodiments, the optimization module 302 is configured to divide the predetermined period of time into blocks of time that are equal to the amount of time it takes to perform media scrub operations on the storage system 106 and/or one or more of the storage devices 202.

The selected block of time, in various embodiments, includes a contiguous and/or continuous block of time. That is, the optimized block of time, in various embodiments, includes a contiguous and/or continuous set of increments of time within the predetermined period of time.

The optimization module 302 is configured to select the optimized block of time based on historical levels of stress for the storage device(s) 202 received from the stress module 306 and/or tracking module 308, as discussed elsewhere herein. In various additional or alternative embodiments, the optimization module 302 is configured to select the optimized/optimal block within the next predetermined period of time and/or prior to a deadline based on the stress level of a particular storage device 202 during one or more previous predetermined periods of time and/or one or more previous extended amounts of time.

An optimized block of time can be selected and/or identified, by the optimization module 302, based on any suitable criterion or criteria related to the level of stress for a particular storage device 202. In some embodiments, the optimized block of time includes a block of time or time segment that includes the lowest average level of stress, median level of stress, or mode level of stress across the contiguous increments of time. That is, the optimization module 302 can calculate the average level of stress, average median level of stress, or average mode level of stress for each contiguous block of time within the predetermined period of time and select the block of time with the lowest average level of stress as the optimized block of time.

In additional or alternative embodiments, the optimized block of time includes a block of time or time segment that includes the lowest level of stress for any particular increment of time during a previous predetermined period of time or extended amount of time. That is, the optimization module 302 can identify the increment of time with the lowest level of stress during a previous predetermined period of time or extended amount of time and select a block of time that includes the increment of time with the absolute lowest level of stress during the previous predetermined period of time or extended amount of time as the optimized block of time.

In further additional or alternative embodiments, the optimized block of time includes a block of time or time segment that includes the lowest average level of stress. That is, the optimization module 302 can calculate the average level of stress for each increment of time, identify the increment of time in each block of time with the lowest average level of stress, and select a block of time that includes the increment of time with the lowest average level of stress during the extended amount of time as the optimized block of time.

In yet further additional or alternative embodiments, the optimized block of time includes a block of time or time segment that includes the smallest value of the highest level of stress for any particular increment of time. That is, the optimization module 302 can identify the increment of time with the highest level of stress in each contiguous block of time and select a block of time that includes the increment of time with the smallest value (e.g., lowest) for the highest level of stress as the optimized block of time.

In further additional or alternative embodiments, the optimized block of time includes a block of time or time segment that includes the smallest value of the highest average level of stress for an increment of time of a block of time during an extended amount of time. That is, the optimization module 302 can calculate the average level of stress for each increment of time, identify the increment of time in each block of time with the highest average level of stress, and select the block of time that includes the increment of time with the smallest value (e.g., lowest) for the highest average level of stress during the extended amount of time as the optimized block of time.

In still further additional or alternative embodiments, the optimized block of time includes a block of time or time segment that includes an increment of time with the largest quantity of low levels of stress during an extended amount of time. That is, the optimization module 302 can determine the quantity of low levels of stress (see stress module 306 in FIG. 3B) for each increment of time and select a block of time that includes the increment of time with the greatest quantity of low levels of stress during the extended amount of time as the optimized block of time.

A task module 304 may include any suitable hardware and/or software that can perform one or more background operations on the storage system 106 and/or the storage device(s) 202. The background operations, in some embodiments, may include media scrub operations and/or other maintenance operations.

The background operations may take any suitable amount of time to perform. In some embodiments, the background operations take about ten minutes to perform, among other amounts of time that are possible and contemplated herein. That is, the background operations may take greater than or less than about ten minutes to perform.

In various embodiments, the background operations are performed at regular intervals of time. The intervals of time may be any suitable interval of time. In some embodiments, the background operations are performed about every four days, among other intervals of time that are possible and contemplated herein. That is, the background operations can be performed at regular intervals of time that are greater than or less than about every four days.

Figure 3B:
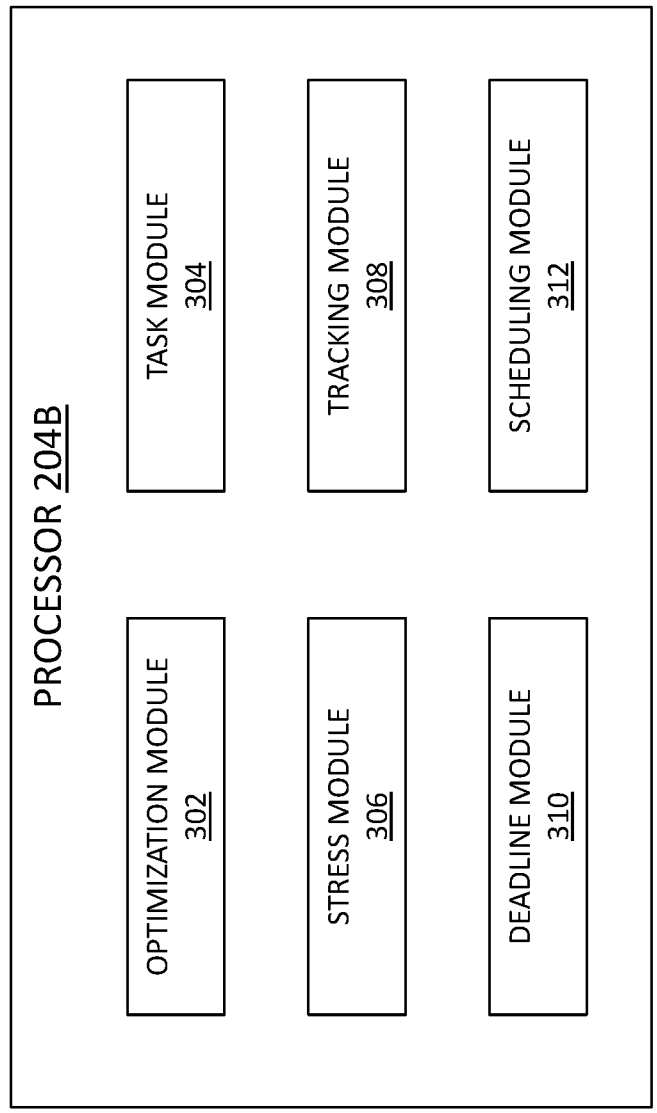

Referring to FIG. 3B, FIG. 3B is block diagram of another embodiment of a processor 204B that can be included in the storage system 106 illustrated in and discussed with reference to FIG. 2. At least in the illustrated embodiment, the processor 204B includes an optimization module 302 and a task module 304 similar to the processor 204A illustrated in and discussed with reference to FIG. 3A. The processor 204B further includes, among other components, a stress module 306, a tracking module 308, a deadline module 310, and a scheduling module 312.

A stress module 306 may include any suitable hardware and/or software that can calculate a level of stress for a set of storage devices 202 (e.g., storage devices 202A through 202n) over a predetermined amount of time. In various embodiments, a level of stress can be determined for each increment of time during the predetermined period of time.

A level of stress can be based on the quantity of computing entities (e.g., applications, threads, client devices 104, etc.) that are accessing a storage device 202 during a particular increment of time. In some embodiments, a level of stress for each increment of time can be represented as a percentage of the peak access stress (PAS), which is the maximum quantity of computing entities accessing the storage device 202 during an increment of time. For example, for a PAS of 200 (e.g., 200 computing entities accessing a storage device 202 during one increment of time), the level of stress for an increment of time in which 80 computing entities are accessing the storage device 202 during this increment of time can be represented as 40% of PAS (e.g., 80/200=0.4 or 40% of PAS).

The stress module 306 can classify the levels of stress into a plurality of stress level ranges. The levels of stress can be classified into any suitable quantity of stress level ranges. In some embodiments, the levels of stress can be classified into three stress level ranges, among other quantities that are possible and contemplated herein. That is, various embodiments may include a greater quantity or smaller quantity of stress level ranges.

A range of stress levels can include any suitable quantity of stress levels therein. In various embodiments, each range can include about ten percentages of PAS, twenty percentages of PAS, twenty-five percentages of PAS, thirty-three percentages of PAS, fifty percentages of PAS, among other sized ranges that are possible and contemplated herein.

For example, a total range (e.g., 0-100%) divided into ten stress level ranges may include ten percentage point increments of PAS in each range (e.g., 0-10% of PAS, 11-20% of PAS, 21-30% of PAS, 31-40% of PAS, 41-50% of PAS, 51-60% of PAS, 61-70% of PAS, 71-80% of PAS, 81-90% of PAS, and 91-100% of PAS). In another example, a total range divided into five stress level ranges may include twenty percentage point increments of PAS in each range (e.g., 0-20% of PAS, 21-40% of PAS, 41-60% of PAS, 61-80% of PAS, and 81-100% of PAS). In yet another example, a total range divided into four stress level ranges may include twenty-five percentage point increments of PAS in each range (e.g., 0-25% of PAS, 26-50% of PAS, 51-75% of PAS, and 76-100% of PAS). In still another example, a total range divided into three stress level ranges may include about thirty-three percentage point increments of PAS in each range (e.g., 0-33% of PAS, 34-66% of PAS, and 67-100% of PAS). In a further example, a total range divided into two stress level ranges may include fifty percentage point increments in each range (e.g., 0-50% of PAS and 51-100% of PAS).

Further, a range can define a particular level of stress. For example, a range of stress levels may define a low level of stress or level 1 of stress (e.g., 0-50% of PAS) and a high level of stress or level 2 of stress (e.g., 51-100% of PAS). In another example, a range of three stress levels may define a low level of stress of level 1 of stress (e.g., 0-33% of PAS), a medium level of stress or level 2 of stress (e.g., 33-66% of PAS), and a high level of stress or level 3 of stress (e.g., 67-100% of PAS).

In some embodiments, the stress module 306 can determine the stress level for each minute of a day for a total of 1440 determined stress levels, among other quantities that are possible and contemplated herein. Various other embodiments can include the stress module 306 determining the stress level for a quantity of increments of time that are greater than or less than 1440 increments of time.

A tracking module 308 can include any suitable hardware and/or software than can track the level of stress for each increment of time during multiple predetermined periods of time and/or during an extended amount of time. The level of stress for each increment of time can be tracked during any suitable quantity of predetermined periods of time and/or during any suitable amount of time.

Figure 4A:
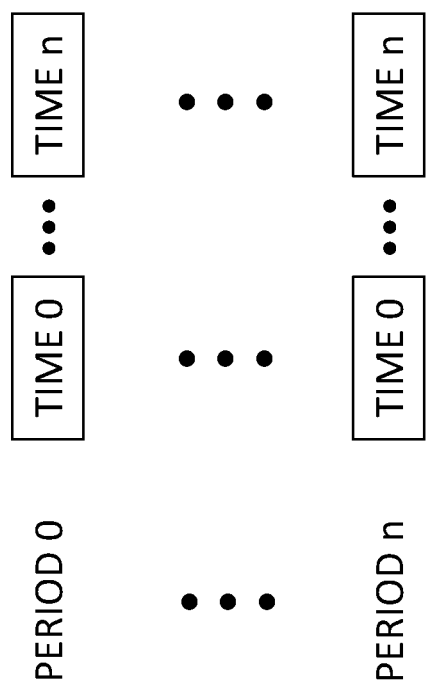
FIGS. 4A and 4B are diagrams illustrating various examples of a quantity of time increments and a quantity of time periods for determining an optimized block of time for performing one or more background operations on a set of storage devices.

With reference to the example illustrated in FIG. 4A, the tracking module 308 can track any quantity of time increments (e.g., time 0 to time n) over any quantity of periods of time (e.g., period 0 to period n). Here, the increments of time may include any suitable duration of time. Likewise, the periods of time may include any suitable duration of time that is the accumulation of the increments of time.

Figure 4B:
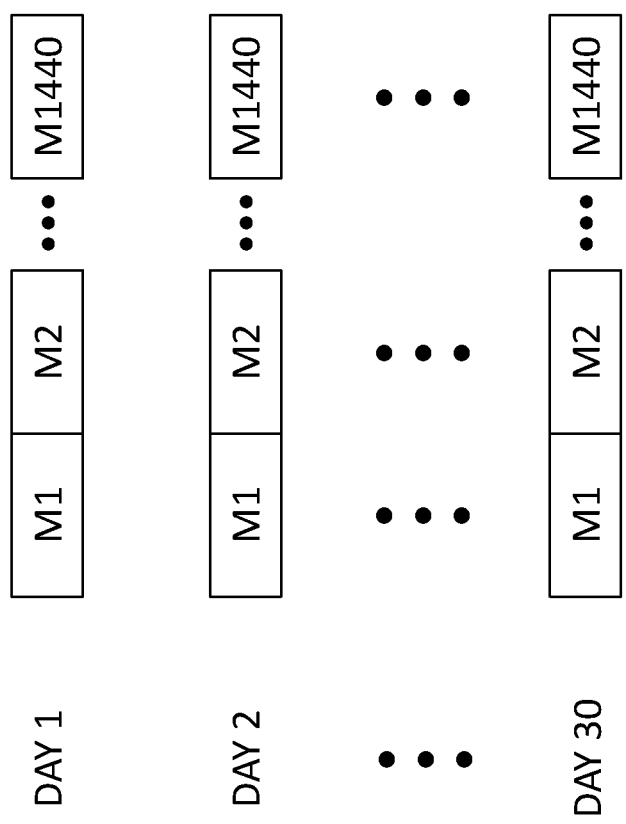

In the example illustrated in FIG. 4B, a tracking module 308 can track the level of stress for each minute of the day over a 30-day period of time. In this example, the tracking module 308 can track each of the 1440 minutes in a day (e.g., Minute 1 (M1) to Minute 1440 (M1440)) for thirty days (e.g., Day 1 to Day 30).

The tracking module 308 can utilize a table or other suitable organizational mechanism to track/record the stress level of each increment of time over the quantity of periods of time. For the example of FIG. 4B, the tracking module 308 can include 30 tables of 1440 minutes each in which the stress level of each respective increment is stored/recorded therein.

In some embodiments, the tracking module 308, either individually or in cooperation with the stress module 306 and/or the optimization module 302, can predict the level of stress for each increment of time during a next or subsequent predetermined period of time based on the previous predetermined periods of time.

In some embodiments, the prediction is based on the average or mean of the levels of stress for an increment of time during the previous periods of time. For example, the predicted level of stress for minute 1000 (e.g., M1000) is the average of each of the percentages of PAS for minute 1000 over the previous 30-day period. That is, the previous 30 percentages of PAS are averaged to predict the level of stress (e.g., a percentage of PAS) for day 31.

In further embodiments, the prediction is based on the median of the levels of stress for an increment of time during the previous periods of time. For example, the predicted level of stress for minute 800 (e.g., M800) is the median percentage of PAS for minute 800 during the previous 30-day period.

In still further embodiments, the prediction is based on the mode (X) of the levels of stress for an increment of time during the previous periods of time. For example, the predicted level of stress for minute 500 (e.g., M500) is the percentage of PAS that occurs most frequently (Z) for minute 500 (Y) during the previous 30-day period. Here, the probably $P(X,Y)=Z/30\times100\%$.

The tracking module 308 can classify the average, median, and/or mode levels of stress into a plurality of stress level ranges. The average, median, and/or mode levels of stress can be classified into any suitable quantity of average, median, and/or mode stress level ranges. In some embodiments, the average, median, and/or mode levels of stress can be classified into three average, median, and/or mode stress level ranges, among other quantities that are possible and contemplated herein. That is, various embodiments may include a greater quantity or smaller quantity of average stress level ranges.

An average, median, and/or mode stress level range can include any suitable range or spread of average, median, and/or mode levels of stress. In some embodiments, the average, median, and/or mode range of levels of stress correspond to the quantity of average, median, and/or mode stress level ranges. In various embodiments, a range of average, median, and/or mode levels of stress can include a range of about ten percentages of PAS, twenty percentages of PAS, twenty-five percentages of PAS, thirty-three percentages of PAS, fifty percentages of PAS, among other sized ranges that are possible and contemplated herein.

For example, ten average, median, and/or mode stress level ranges may include ten percentages of PAS in each range (e.g., 0-10% of PAS, 11-20% of PAS, 21-30% of PAS, 31-40% of PAS, 41-50% of PAS, 51-60% of PAS, 61-70% of PAS, 71-80% of PAS, 81-90% of PAS, and 91-100% of PAS). In another example, five average, median, and/or mode stress level ranges may include twenty percentages of PAS in each range (e.g., 0-20% of PAS, 21-40% of PAS, 41-60% of PAS, 61-80% of PAS, and 81-100% of PAS). In yet another example, four average, median, and/or mode stress level ranges may include twenty-five percentages of PAS in each range (e.g., 0-25% of PAS, 26-50% of PAS, 51-75% of PAS, and 76-100% of PAS). In still another example, three average, median, and/or mode stress level ranges may include thirty-three percentages of PAS in each range (e.g., 0-33% of PAS, 34-66% of PAS, and 67-100% of PAS). In a further example, two average, median, and/or mode stress level ranges may include fifty percentages of PAS in each range (e.g., 0-50% of PAS and 51-100% of PAS).

Further, a range can define a particular average, median, and/or mode level of stress. For example, a range of average, median, and/or mode stress levels may define a low level of stress or level 1 of stress (e.g., 0-50% of PAS) and a high level of stress or level 2 of stress (e.g., 51-100% of PAS). In another example, a range of three average, median, and/or mode stress levels may define a low level of stress or level 1 of stress (e.g., 0-33% of PAS), a medium level of stress or level 2 of stress (e.g., 33-66% of PAS), and a high level of stress or level 3 of stress (e.g., 67-100% of PAS).

A deadline module 310 can include any suitable hardware and/or software that can generate and/or track a deadline for performing one or more background operations (e.g., media scrub operations) on a storage device 202. In various embodiments, the deadline module 310 creates the deadline based on the amount or gap of time between performing background operations.

In some embodiments, the deadline module 310 generates a deadline for performing one or more background operations on each storage device 202. A deadline may be any suitable future point in time and/or any amount of time in the future.

In some embodiments, the deadline module 310 generates a deadline for performing media scrub operations on each storage device 202 every four days, among other ranges of time that are greater than or less than four days. That is, because media scrub operations should be performed on each storage device 202 every four days, the deadline module 310 creates a corresponding deadline for performing each set of media scrub operations.

A deadline, in various embodiments, is a point in time in the future at or before which one or more background operations on a storage device 202 are to be performed. In some embodiments, a deadline is a future point in time at or before which media scrub operations on a storage device 202 are to be performed.

A scheduling module 312 may include any suitable hardware and/or software that can schedule performance of one or more background operations for each storage device 202 of a set of storage devices 202. In some embodiments, a scheduling module 312 is configured to schedule performance of media operations for a plurality of storage devices 202.

The one or more background operations (e.g., media scrub operations) for each storage device 202 is scheduled based on the timing for the optimized block of time for each particular storage device 202. In various embodiments, the storage devices 202 are scheduled and/or ordered based on the chronological order of the optimized blocks of time to be performed.

Figure 5:
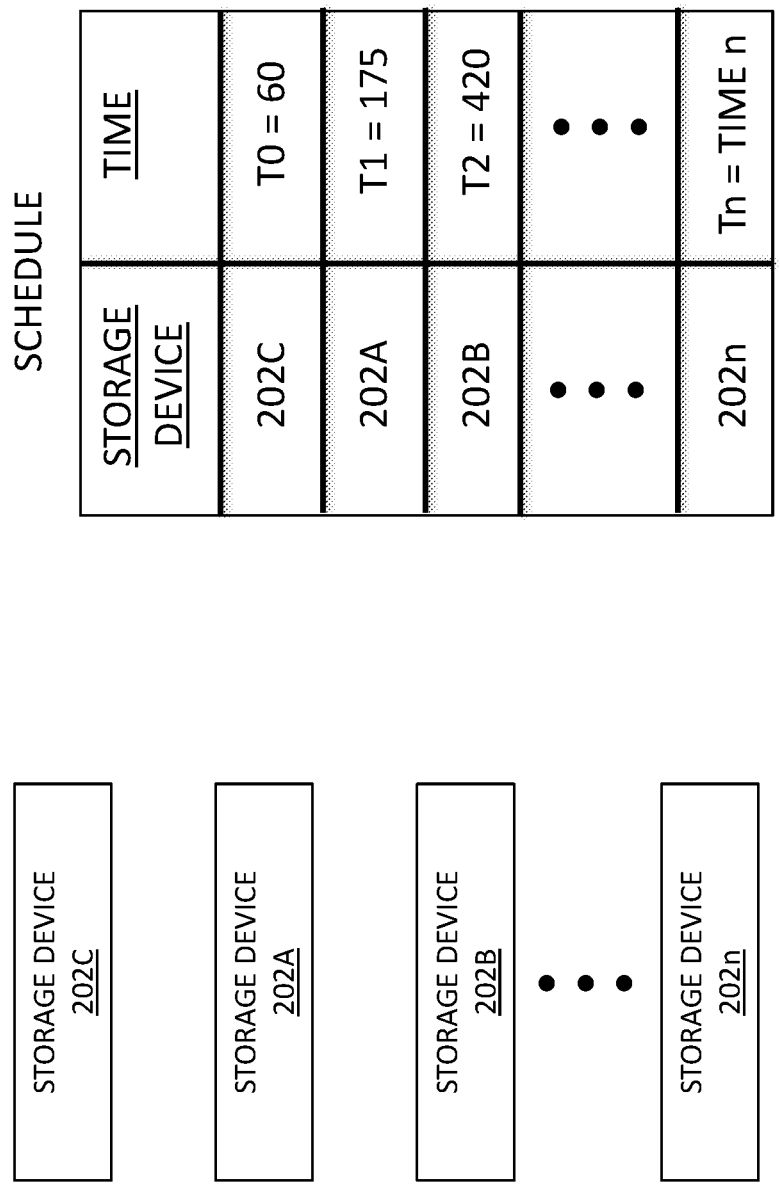
FIG. 5 is a diagram of one example of scheduling performance of one or more background operations on a set of storage devices based on the timing of their respective optimized blocks of time for performing the one or more background operations.

With reference to FIG. 5, FIG. 5 illustrates a diagram of one example of the scheduling of background operations (e.g., media scrub operations) for storage devices 202A, 202B, 202C . . . 202*n*. In the illustrated example, the scheduling module 312 schedules storage device 202C first (T0) because the optimized block of time for performing the background operations (e.g., media scrub operations) on storage device 202C occurs 60 minutes in the future. Further, the scheduling module 312 schedules storage device 202A second (T1) because the optimized block of time for performing the background operations (e.g., media scrub operations) for storage device 202A occurs 175 minutes in the future. In addition, the scheduling module 312 schedules storage device 202B third (T2) because the optimized block of time for performing the background operations (e.g., media scrub operations) for storage device 202B occurs 420 minutes in the future. Moreover, the scheduling module 312 schedules storage device 202*n* last (Tn) because the optimized block of time for performing the background operations (e.g., media scrub operations) for storage device 202*n* occurs at the latest point in time in the future. The scheduling module 312 continues to schedule performance of the background operations for each storage device 202 as the background operations are to be performed prior to future deadlines determined for each storage device 202.

In response to the current time being equal to the optimized block of time for a particular storage device 202, the task module 304 performs the background operations (e.g., media scrub operations) for the particular storage device 202. That is, the task module 304 performs the background operations (e.g., media scrub operations) on the storage devices 202 in the order in which the storage devices 202 are scheduled by the scheduling module 312.

Figure 6:
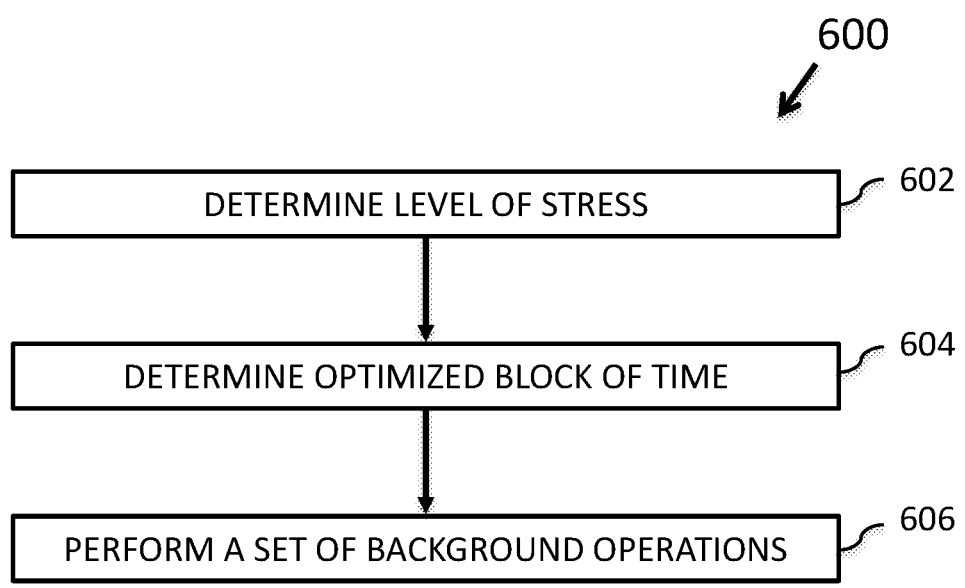
FIG. 6 is a schematic flowchart diagram illustrating one embodiment of a method for accessing a storage resource for performance of one or more background operations thereon.

Referring to FIG. 6, FIG. 6 is a schematic flow chart diagram illustrating one embodiment of a method 600 for accessing a storage resource for performance of one or more background operations thereon. At least in the illustrated embodiment, the method 600 can begin by a processor 204 (e.g., via a stress module 306) determining a level of stress for each increment of time during a predetermined period of time for a storage device 202 (block 602). The level of stress can be determined utilizing any of the techniques for determining the level of stress for an increment of time discussed herein.

The processor 204 can determine (e.g., via an optimized module 302) an optimized block of time for performing one or more background operations (e.g., media scrub operations) during the predetermined period of time (block 604). The optimized block of time can be determined utilizing any of the techniques for determining an optimized block of time for performing one or more background operations (e.g., media scrub operations) within a predetermined period discussed herein.

In response to the current time being equal to the beginning time of the optimized block of time, the processor 204 performs (e.g., via a task module 304) the one or more background operations (block 606). In some embodiments, the one or more background operations include a set of media scrub operations.

Figure 7:
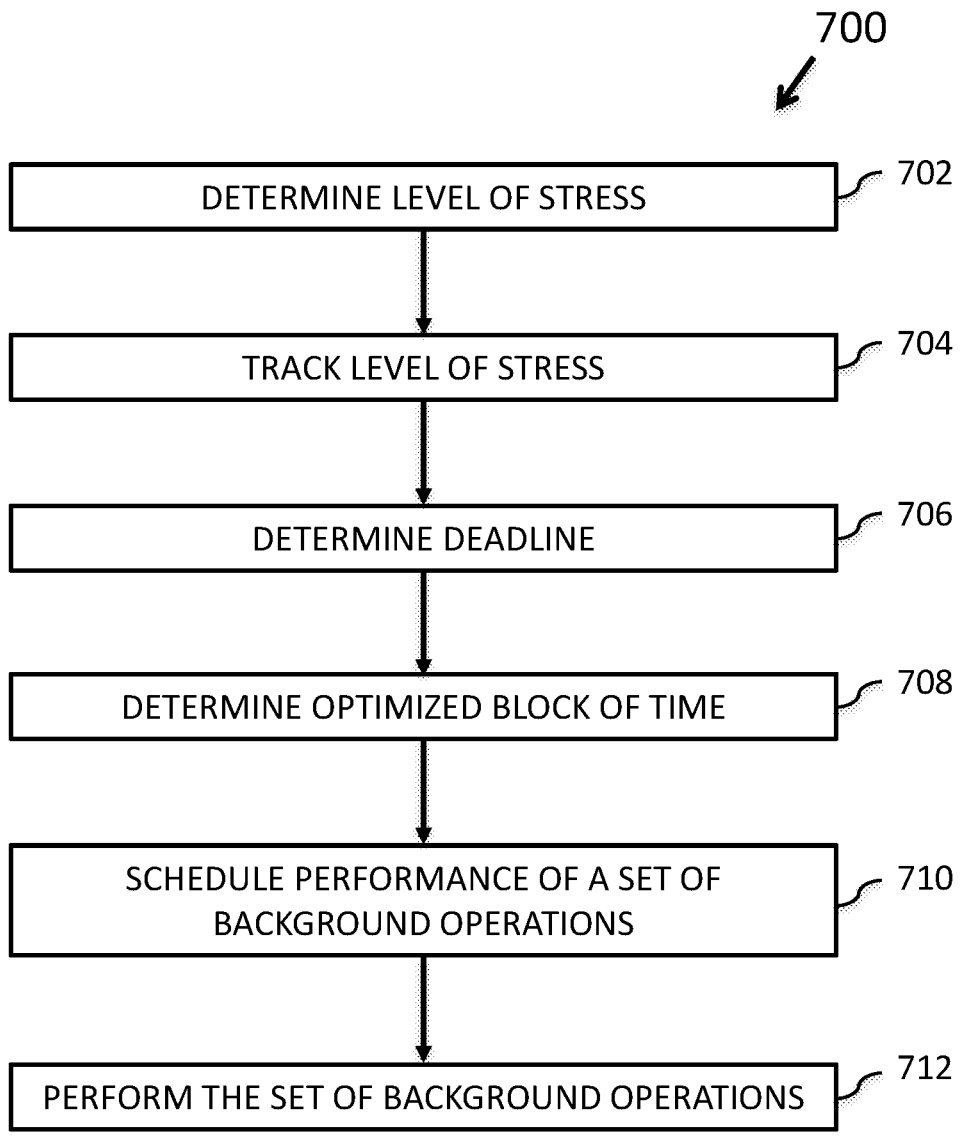
FIG. 7 is a schematic flowchart diagram illustrating another embodiment of a method for accessing a storage resource for performance of one or more background operations thereon.

With reference to FIG. 7, FIG. 7 is a schematic flow chart diagram illustrating another embodiment of a method 700 for accessing a storage resource for performance of one or more background operations thereon. At least in the illustrated embodiment, the method 700 can begin by a processor 204 (e.g., via a stress module 306) determining a level of stress for each increment of time during a predetermined period of time for a set of storage devices 202 (block 702). The level of stress can be determined utilizing any of the techniques for determining the level of stress for an increment of time discussed herein.

The processor 204 tracks the level of stress for each increment of time in each storage device 202 over multiple predetermined periods of time (block 704). The levels of stress for each increment of time can be tracked utilizing any of the techniques for tracking the levels of stress for each increment of time over multiple predetermined periods of time discussed herein.

Further, the processor 204 can determine (e.g., via a deadline module 310) a deadline for performing one or more background operations (e.g., media scrub operations) for each storage device 202 (block 706). The deadline can be determined utilizing any of the techniques for determining a deadline for performing one or more background operations (e.g., media scrub operations) on a storage device 202 discussed herein.

The processor 204 can determine (e.g., via an optimized module 302) an optimized block of time for performing one or more background operations (e.g., media scrub operations) prior to the deadline (block 708). The optimized block of time can be determined utilizing any of the techniques for determining an optimized block of time for performing one or more background operations (e.g., media scrub operations) prior to a deadline discussed herein.

In addition, the processor 204 can schedule (e.g., via a scheduling module 312) performance of one or more background operations (e.g., media scrub operations) prior to the deadline for each storage device 202 of a set of storage devices (block 710). Performance of the background operations for each of the storage devices 202 is based on each respective optimized block of time and are scheduled utilizing any of the techniques for scheduling performance of the one or more background operations (e.g., media scrub operations) prior to a deadline discussed herein.

In response to the current time being equal to the respective optimized block of time for each storage device 202, the processor 204 performs (e.g., via a task module 304) the one or more background operations (block 712). In some embodiments, the one or more background operations include a set of media scrub operations.

Figure 8:
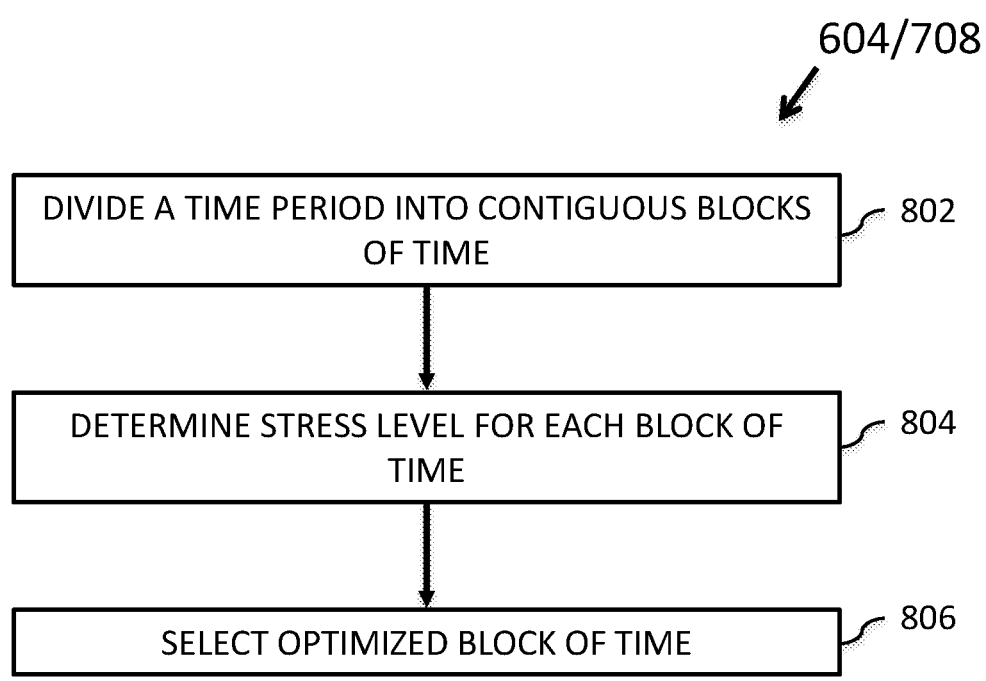
FIG. 8 is a schematic flowchart diagram illustrating one embodiment of a method for determining an optimized block of time for performing one or more background operations on each storage device in a set of storage devices.

Referring to FIG. 8, FIG. 8 is a schematic flow chart diagram illustrating one embodiment of a method 800 for determining an optimized block of time for performing one or more background operations (e.g., media scrub operations) on each storage device 202 in a set of storage devices 202. At least in the illustrated embodiment, the method 800 can begin by a processor 204 dividing a predetermined period of time into a plurality of contiguous and/or continuous increments of time (block 802). The predetermined period of time and/or each increment of time can include any suitable amount of time, as discussed elsewhere herein.

The processor 204 can determine the stress level for each block of time (block 804). The stress level for each block of time can be determined utilizing any of the techniques for determining the stress level for a block of time discussed herein.

The processor 204 can further select a block of time as an optimized block of time for performing one or more background operations (e.g., media scrub operations) (block 806). The optimized block of time can be selected/determined utilizing any of the techniques for selecting/determining an optimized block of time for performing one or more background operations (e.g., media scrub operations) prior to a deadline discussed herein.

While the embodiments disclosed herein have been discussed with reference to storage devices, the various embodiments are not limited to storage devices. That is, various other embodiments may include any computing device and/or system that is and/or can be shared by two or more other computing devices and/or applications. In other words, the spirit and scope of this disclosure is not limited to storage devices, and various other embodiments can include any suitable type of shared computing resource. Examples of computing resources that can be shared by two or more other computing devices and/or applications include, but are not limited to, a processor (e.g., a processor that offers time slices for various applications to perform work), a server (e.g., a server that offers services to other users and/or systems), a computing network (e.g., a computing network in which many users, devices, and/or systems connect to access other users, devices, and/or systems), any type of storage device (e.g., a hard drive on an individual's computing device or an entire enterprise storage controller (e.g., the IBM DS8886 family of products from International Business Machines Corporation of Armonk, N.Y.)), among other computing resources and/or types of computing resources that can be shared that are possible and contemplated herein.

The described embodiments are to be considered in all respects only as illustrative and not restrictive. The scope of the technology is, therefore, indicated by the appended claims rather than by the foregoing description. All changes which come within the meaning and range of equivalency of the claims are to be embraced within their scope.

What is claimed is:

1. An apparatus, comprising:
an optimization module that determines an optimized block of time within a predetermined period of time to perform a set of background operations on a shared computing resource; and
a task module that performs the set of background operations during the optimized block of time,
wherein:
the optimized block of time is determined based on a level of stress for the shared computing resource during each increment of time in the predetermined period of time,
the predetermined amount of time includes an amount of time it takes to perform the set of background operations,
in determining the optimized block of time, the optimization module is configured to:
divide the predetermined period of time into contiguous time segments equal to the amount of time it takes to perform the set of background operations,
receive a group stress level for each contiguous time segment, and
select the optimized block of time based on the group stress level for each contiguous time segment, and
at least a portion of said modules comprise one or more of a set of hardware circuits, a set of programmable hardware devices, and executable code stored on a set of non-transitory computer-readable storage media.

2. The apparatus of claim 1, further comprising:
a stress module that determines the level of stress for the shared computing resource during each increment of time in the predetermined period of time.

3. The apparatus of claim 2, wherein the stress module is configured to determine the level of stress for each increment of time based on a quantity of entities accessing the shared computing resource during each respective increment of time.

4. The apparatus of claim 2, further comprising:
a tracking module that tracks the level of stress for the shared computing resource over a plurality of predetermined periods of time.

5. The apparatus of claim 1, wherein, in selecting the optimized block of time, the optimization module is configured to select a contiguous time segment as the optimized block of time based on one of:
an average level of stress for increments of time in each contiguous time segments;
an increment of time in a contiguous time segment including a lowest level of stress;
a contiguous time segment including a smallest value of a highest level of stress for an increment of time; and
a contiguous time segment including a highest quantity of low levels of stress for an increment of time over a plurality of predetermined periods of time.

6. The apparatus of claim 1, wherein, in performing the background operations, the task module is configured to perform media scrub operations on a storage device.

7. The apparatus of claim 1, further comprising:
a deadline module that determines a deadline for performing the set of background operations,
wherein the predetermined period of time expires at one of the deadline and before the deadline.

8. The apparatus of claim 1, wherein:
the shared computing resource includes a plurality of storage devices;
the optimization module and the task module perform their respective operations on each storage device of the plurality of storage devices; and
the apparatus further comprises:
a scheduling module that schedules performance of the set of background operations during each respective optimized block of time determined for each storage device of the plurality of storage devices.

9. The apparatus of claim 1, further comprising:
a tracking module that tracks the level of stress for the shared computing resource over a plurality of predetermined periods of time; and
a stress module that:
calculates a tracked level of stress for each increment of time based on the tracked level of stress over the plurality of predetermined periods of time, and
determines a plurality of stress level ranges for the tracked levels of stress,
wherein each stress level range includes a plurality of tracked levels of stress.

10. A method, comprising:
determining, by a processor, a level of stress for a shared computing resource during each increment of time in a predetermined period of time;
determining an optimized block of time within the predetermined period of time to perform a set of background operations on the shared computing resource based on the determined level of stress; and
performing the set of background operations during the optimized block of time,
wherein:
the predetermined amount of time includes an amount of time it takes to perform the set of background operations, and
determining the optimized block of time comprises:
dividing the predetermined period of time into contiguous time segments equal to the amount of time it takes to perform the set of background operations,
determining a group stress level for each contiguous time segment, and
selecting the optimized block of time based on the group stress level for each contiguous time segment.

11. The method of claim 10, wherein the level of stress for each increment of time is determined based on a quantity of entities accessing the shared computing resource during each respective increment of time.

12. The method of claim 10, further comprising:
tracking the level of stress for the shared computing resource over a plurality of predetermined periods of time;
calculating a tracked level of stress for each increment of time based on the tracked level of stress over the plurality of predetermined periods of time; and
determining a plurality of stress level ranges for the tracked levels of stress,
wherein each stress level range includes a plurality of tracked levels of stress.

13. The method of claim 10, wherein selecting the optimized block of time comprises selecting a contiguous time segment as the optimized block of time based on one of:
an average level of stress for increments of time in each contiguous time segments;
an increment of time in a contiguous time segment including a lowest level of stress;
a contiguous time segment including a smallest value of a highest level of stress for an increment of time; and
a contiguous time segment including a highest quantity of low levels of stress for an increment of time over a plurality of predetermined periods of time.

14. The method of claim 10, wherein:
performing the background operations comprises performing media scrub operations on a storage device;
the method further comprises determining a deadline for performing the set of background operations; and
the predetermined period of time expires at one of the deadline and before the deadline.

15. The method of claim 10, wherein:
the shared computing resource includes a plurality of storage devices;
determining the level of stress comprises determining the level of stress for each storage device during each increment of time in the predetermined period of time;
determining the optimized block of time comprises determining the optimized block of time within the predetermined period of time to perform the set of background operations on each storage device based on the determined level of stress; and
the method further comprises scheduling performance of the set of background operations during each respective optimized block of time determined for each storage device of the plurality of storage devices.

16. A computer program product comprising a computer-readable storage medium including program instructions embodied therewith, the program instructions executable by a processor to cause the processor to:
determine a level of stress for a shared computing resource during each increment of time in a predetermined period of time;
determine an optimized block of time within the predetermined period of time to perform a set of background operations on the shared computing resource based on the determined level of stress; and
perform the set of background operations during the optimized block of time,
wherein:
the predetermined amount of time includes an amount of time it takes to perform the set of background operations, and
determining the optimized block of time comprises:
dividing the predetermined period of time into contiguous time segments equal to the amount of time it takes to perform the set of background operations,
determining a group stress level for each contiguous time segment, and
selecting the optimized block of time based on the group stress level for each contiguous time segment.

17. The computer program product of claim 16, wherein:
selecting the optimized block of time comprises selecting a contiguous time segment as the optimized block of time based on one of:
an average level of stress for increments of time in each contiguous time segments,
an increment of time in a contiguous time segment including a lowest level of stress,
a contiguous time segment including a smallest value of a highest level of stress for an increment of time, and a contiguous time segment including a highest quantity of low levels of stress for an increment of time over a plurality of predetermined periods of time.

18. The computer program product of claim 16, wherein:
performing the background operations comprises performing media scrub operations on a storage device;
the processor is further configured to determine a deadline for performing the set of background operations; and
the predetermined period of time expires at one of the deadline and before the deadline.

19. The computer program product of claim 16, wherein:
the shared computing resource includes a plurality of storage devices;
determining the level of stress comprises determining the level of stress for each storage device during each increment of time in the predetermined period of time;
determining the optimized block of time comprises determining the optimized block of time within the predetermined period of time to perform the set of background operations on each storage device based on the determined level of stress; and
the processor is further configured to schedule performance of the set of background operations during each respective optimized block of time determined for each storage device of the plurality of storage devices.

20. The computer program product of claim 16, wherein the program instructions further cause the processor to:
track the level of stress for the shared computing resource over a plurality of predetermined periods of time;
calculate a tracked level of stress for each increment of time based on the tracked level of stress over the plurality of predetermined periods of time; and
determine a plurality of stress level ranges for the tracked levels of stress,
wherein each stress level range includes a plurality of tracked levels of stress.

\* \* \* \* \*